United States Patent Office 2,809,188
Patented Oct. 8, 1957

2,809,188

ESTERS AND ESTER SALTS OF OLEFIN-P₄S₃-OXYGEN CONDENSATION PRODUCTS AND LUBRICANTS CONTAINING THEM

Gerard A. Loughran, Stamford, Conn., and Edwin O. Hook, Cleveland, Ohio, assignors to American Cyanamid Company, New York, N. Y., a corporation of Maine No Drawing. Application March 9, 1955,
Serial No. 493,291

12 Claims. (Cl. 260—139)

This invention relates to a novel class of esters of the condensation products of olefins with phosphorous sesquisulfide and oxygen, and to polyvalent salts of these esters. The invention includes the esters and their salts as new compositions of matter, methods for their preparation, and hydrocarbon lubricating oil compositions containing them, as will hereinafter be more fully described.

The condensation products of olefins with phosphorous sesquisulfide are well known, and have been used for many years as corrosion inhibitors in hydrocarbon lubricating oils. These compounds, however, do not form oil-soluble polyvalent metal salts, and therefore their use has been restricted to the class of non-metallic lubricating oil additives.

It has recently been shown that the condensation of phosphorous sesquisulfide with a wide variety of organic substances, including olefinic hydrocarbons, is accelerated by introducing free oxygen into the reaction mixture. This is described in U. S. Patent No. 2,483,571, dated October 4, 1949. The patent shows that condensation products obtained by reacting phosphorous sesquisulfide with aromatic and aliphatic alcohols and with unsaturated esters will form polyvalent metal salts having good detergency in hydrocarbon lubricating oils; however, the preparation of metal salts from the olefin-P₄S₃ condensation products obtained by this method is not described.

Our present invention is based on an extensive study of olefin-phosphorous sesquisulfide-oxygen condensation products prepared by the process of the above patent and by other methods including an identification of the constitution of these products. As a result of this study we have discovered a novel class of esters which can be obtained therefrom and which are characterized by the property of forming heat-stable and hydrocarbon oil-soluble polyvalent metal salts, many of which possess good detergency in hydrocarbon lubricating oil compositions.

It is therefore a principal object of our invention to provide novel classes of esters and salts obtainable from olefin-phosphorous sesquisulfide-oxygen condensation products and novel lubricating oil compositions containing them. Further objects of our invention will appear from the following description of the principles involved and of preferred embodiments thereof.

We have found that the products obtained by condensing olefins with phosphorous sesquisulfide while injecting oxygen into the reaction mixture differ in a number of important respects from the simple olefin-P₄S₃ condensation products. We have found that the oxygen enters into this reaction in a definite combining ratio, and that it forms with the phosphorous sesquisulfide a compound having the formula P₄S₃O₄. One molecular proportion of this compound will react with about three mols of an olefin to form condensation products having the empirical formula $$(C_nH_{2n})_3 \cdot P_4S_3O_4$$

but which are actually linear polymers resulting from olefins polymerization during the course of the reaction. The same products are obtained either by passing air or other oxygen-containing gas through a mixture of suitable quantities of olefin and P₄S₃ at temperatures of 120° C. and higher, as described in the patent, or by first oxidizing the P₄S₃ with air or oxygen and then condensing it with the olefinic hydrocarbon. In both cases about three molecular equivalents of olefin are combined with one molecule of P₄S₃O₄.

We have attempted to form metal salts of these olefin-P₄S₃O₄ condensation products by reacting them with barium hydroxide and with calcium hydroxide in hydrocarbon lubricating oils and other solvents, but only oil-insoluble products were obtained. We also attempted to obtain products capable of forming oil-soluble salts by reacting P₄S₃ with mixtures of olefins and higher alcohols such as N-decanol and N-octadecanol and also with unsaturated esters such as N-butanol crotonate. We found, however, that in such mixtures the alcohols and esters react preferentially with the phosphorous sesquisulfide to the exclusion of the olefin, so that substantially all of the olefin can be recovered in unreacted form from the reaction mixture.

We have discovered, however, that alcoholysis of the olefin-P₄S₃O₄ condensation products described above with monohydroxy organic compounds such as monohydric alcohols and phenols results in the formation of esters containing, in addition to the combined hydrocarbon, three mols of combined alcohol or phenol. These new esters are soluble in hydrocarbon lubricating oils and in a wide variety of other organic solvents, and possess the property of inhibiting corrosion in lubricating oils when used in amounts of 0.1% to 3% or more therein. Some of them, and particularly the esters of aliphatic monohydric alcohols of 1–4 carbon atoms and their alkali metal salts also possess good insecticidal properties. Some of the esters, and particularly those obtained with isopropyl and isobutyl alcohol as well as their alkali metal salts are also good flotation reagents for the froth flotation of finely divided sulfide minerals, particularly copper sulfide ores. Although the esters are polymeric in character and probably contain both phosphinic acid and phosphonic acid groups their composition corresponds to the empirical formula $$(C_nH_{2n})_3 \cdot P_4S_3O_4 \cdot (OX)_3$$

in which $n$ is a whole number greater than 1 and preferably greater than 7 and X is an aliphatic, cycloaliphatic or monocyclic aromatic hydrocarbon residue corresponding to the alcohol used. As will be shown later, the esters of this class which are most suitable for use in preparing lubricating oil antioxidants and detergents are those obtained from alcohols and alkylphenols containing from about 10 to 18 or more carbon atoms.

One of the most important properties of the new esters of our invention is that they are reactive with basic metal compounds to form salts which are soluble in organic solvents. We have prepared a wide variety of these salts and find that in all cases the olefin-P₄S₃O₄ ester reacts as a trivalent radical; i. e., one molecular proportion of the ester will combine with one mol of a trivalent metal hydroxide such as aluminum hydroxide or with three mols of an alkali metal hydroxide or carbonate while two mols of the ester combine with three mols of a hydroxide or hydrated oxide of a divalent metal such as calcium, barium, strontium, magnesium, zinc and the like. The polyvalent metal salts obtained from the esters of higher aliphatic monohydric alcohols containing 10 or more carbon atoms and from the corresponding alkylphenols are clear oils which vary in color from yellow to brown and are quite soluble in hydrocarbon lubricating oils; the corresponding salts of the esters of methanol, ethanol, propanol, isopropanol, the butanols and other aliphatic alcohols of 1–9 carbon atoms are also oil-soluble but do not possess the same high degree of detergency in lubricating oils that is exhibited by the higher aliphatic and alkyl-substituted aromatic alcohol and phenol esters.

While any olefin may be condensed with phosphorous sesquisulfide and oxygen to form condensation products suitable as starting materials for the preparation of the esters and ester salts of our invention, we prefer to use the higher olefins containing 8 or more carbon atoms such as octene-1, decene-1, octadecene-1 and propylene and butylene polymers having molecular weights in excess of about 125. Olefin hydrocarbons of much higher weight may be used if desired; for example, we have prepared compounds having good oil solubility from polybutenes having a molecular weight as high as 780. Olefins of 2–7 carbon atoms may of course be used, but their condensation with $P_4S_3$ and oxygen must be carried out under superatmospheric pressures in a closed vessel and the low molecular weight of the olefin usually results in an undesirably high degree of polymerization. The olefin-phosphorous sesquisulfide-oxygen condensation products most suitable for use as starting materials in practicing our invention have a degree of polymerization on the order of about 20–50 or slightly more and corresponding molecular weights depending on the number of carbon atoms in the olefin used.

Condensation between the olefin and the phosphorous sesquisulfide and oxygen is usually carried out by the procedure described in the patent referred to above using temperatures of about 120°–150° C. If desired, however, the phosphorous sesquisulfide and oxygen may first be reacted together and the resulting compounds condensed with olefins.

The olefin-phosphorous sesquisulfide-oxygen condensation products can be esterified with any monohydric alcohol or phenol to form esters in accordance with our invention. Presumably polyhydric alcohols and phenols could also be used, but the products obtained would be highly polymeric. Lower aliphatic alcohols such as methanol, ethanol, propanol or isopropanol, any of the isomeric butanols or pentanols may be used as well as alcohols of 6–9 carbon atoms of the type obtainable by the catalytic hydrogenation of oxides of carbon as described, for example, in U. S. Patent No. 2,368,000. In the preparation of antioxidants and detergents for lubricating oils, however, we prefer to use the aliphatic alcohols of 10–18 carbon atoms such as N-decanol, N-dodecanol, mixtures of higher straight chain primary alcohols of 8–14 carbon atoms obtained by the reduction of coconut oil fatty acids and their esters, octadecanol-1 and mixtures of saturated and unsaturated higher aliphatic alcohols obtainable by the reduction of the fatty acids of tall oil, cotton seed oil and the like, and branched-chain primary alcohols of comparable molecular weights obtained by the "oxo" process. Monocyclic phenols such as phenol itself, cresols, xylenols and the like may also be used, but we prefer to employ the alkylphenols of 10–18 carbon atoms or more obtained by condensing phenol or cresol with butenes, hexenes, polypropylenes, polybutylenes and the like. Alicyclic alcohols of comparable molecular weight, such as those obtained by hydrogenating these phenols may likewise be used. As has been stated, at least three mols of one or more of these alcohols, either singly or in admixture, should be used for each mol of the olefin-$P_4S_3O_4$ condensation product.

The alcoholysis or esterification of the olefin condensation products can be carried out simply by adding the requisite quantity of alcohol or phenol and heating the mixture at reaction temperatures until the alcoholysis is complete. A solvent such as benzene, toluene, acetone, diisobutyl ketone and the like may be present in the reaction mixture if desired or an excess of the alcohol may be used as the solvent. Reaction temperatures will vary with the boiling point of the particular alcohol being used, but in general will range from the refluxing temperature when methanol or ethanol is used to about 150°–160° C. The esterified products are preferably stripped of solvent and excess alcohol by heating under reduced pressure for a short time, after which they may be used directly or converted into the corresponding metal salts.

Alkali metal salts of the esters can be prepared simply by mixing one mol of the ester with three mols of the alkali metal hydroxide or carbonate such as sodium carbonate or bicarbonate or sodium hydroxide. When alkali metal salts of the lower aliphatic alcohol esters are prepared in this manner the salt formation may conveniently be carried out before stripping off the excess alcohol, since the alkali metal salts are soluble in these alcohols. The alkali metal salts of higher alcohol esters, such as the N-decyl or N-octadecyl ester, are conveniently prepared after first dissolving the ester in a water-immiscible organic solvent such as lubricating oil, since the alkali metal salts of these esters are soluble in hydrocarbon oils and may be used as antioxidants and detergents therein.

The preferred metal salts of our invention are, however, the salts of polyvalent metals since these possess a much higher degree of detergency in lubricating oils than do the alkali metal salts. Any desired polyvalent metal salt can be prepared by reacting a hydroxide or hydrated oxide of the metal with any of the esters described above. The salt formation is preferably carried out in the presence of an organic solvent such as benzene, toluene, alcohols, ketones and the like, but in most cases we prefer to employ lubricating oil as at least a part of the solvent in order to obtain the salt directly as a dispersion in lubricating oil. Additional water added to assist the salt formation, as well as water produced by the reaction and any volatile solvent that may be present, can then be removed by stripping the oil solution at elevated temperatures and under reduced pressures. Typical polyvalent metal salts that can be formed in this manner are the salts of aluminum, calcium, barium, strontium, magnesium, zinc, tin, lead and mercury.

The esters and salts of our invention are employed in lubricating oil compositions in amounts of about 0.1%–3% or more as antioxidants and detergents. They can be used as the only antioxidant or detergent in the oil, but for most purposes they are preferably employed in compounded oils in admixture with other additives. For example, the barium, calcium and magnesium salts of the esters of aliphatic alcohols and phenols of 10 or more carbon atoms are used as detergents in hydrocarbon oils which also contain an antioxidant such as 2,2'-methylene bis-(4-methyl-6-tertiary butylphenol), zinc dialkyldithiophosphates, 2,4-dialkylphenol sulfides and their calcium and barium salts and the like. These antioxidants are also preferably employed in quantities of about 0.1–3% in the oil, and preferably in quantities of about 0.5–1.5%, based on the weight of the oil.

The invention will be further described and illustrated by the following specific examples. It should be understood, however, that while these examples may describe in detail a large number of compounds falling within the scope of the invention, as well as a variety of methods of preparation, they are given primarily for illustrative purposes and the invention in its broader aspects is not limited thereto.

*Example 1.—Reaction of olefins with $P_4S_3$ and air*

A wide variety of olefins were reacted with $P_4S_3$ and air by heating the liquid olefin and finely divided $P_4S_3$ in a molar ratio greater than 3 to 1 at temperatures within the range of 120°–160° C. The reactions were carried out in flasks of appropriate size each equipped with an agitator and reflux condenser and provided with a tube extending below the surface of the liquid for injecting air. In product Nos. 1–5, inclusive, the excess olefin was removed from the condensation product by distillation under reduced pressure while in all the others it was retained. In several cases a solvent such as diisobutyl ketone was added to avoid the deposition of resinous polymerization products. In most of the preparations the air was bubbled through the mixture at the rate of about 10-12 liters per hour. The materials used and the reaction times and temperatures are set forth in the following table:

TABLE 1

| Prod. No. | Olefin | Grms. | Mols | $P_4S_3$ Grms. | $P_4S_3$ Mols | Reaction Time, Hrs. | Reaction Temp., °C. | Prod. Yield, Grms. |
|---|---|---|---|---|---|---|---|---|
| 1 | Dodecene-1 | 336 | 2.0 | 88 | 0.4 | 31 | 120-162 | 306 |
| 2 | do | 506 | 3.0 | 88 | 0.4 | 40 | 120-132 | 315 |
| 3 | do | 168 | 1.0 | 44 | 0.2 | 49 | 140 | 172 |
| 4 | Hexadecene-1 | 500 | 2.23 | 145 | 0.66 | 45 | 140-156 | 556 |
| 5 | do | 621 | 2.08 | 154 | 0.7 | 18 | 140-155 | 593 |
| 6 | do | 561 | 2.5 | 110 | 0.5 | 26 | 125-150 | 690 |
| 7 | do | 276 | 1.23 | 66 | 0.3 | 17 | 140-150 | 346 |
| 8 | Triisobutylene | 372 | 2.0 | 110 | 0.5 | 26½ | 117-144 | 265 |
| 9 | Tripropylene | 300 | 1.79 | 88 | 0.4 | 9 | 120-150 | ¹ 403 |
| 10 | Tech. Dodecenes | 84 | 0.5 | 22 | 0.1 | 9 | 140-150 | ² 246 |
| 11 | do | 132 | 0.9 | 22 | 0.1 | 12 | 130-140 | 170 |
| 12 | Polybutene (M. W. 780) | 702 | 0.9 | 66 | 0.3 | 17½ | 130-140 | 760 |
| 13 | do | 297 | 0.9 | 66 | 0.3 | 24 | 140-150 | 327 |

¹ 50% of SAE-10 hydrocarbon oil added as solvent.
² 138 grams of diisobutyl ketone added as solvent.

Samples of products Nos. 1-5 were analyzed to determine the molar ratio of combined olefin to $P_4S_3$. These ratios were 3.1; 3.05; 3.2; 3.1 and 2.5, respectively.

All of the condensation products were polymeric in character. Product No. 2 was analyzed and found to contain 14.4% of phosphorous and 11.4% of sulfur; the molar ratio of these elements was therefore 3.92:3.

Example 2

Analysis of some of the products of Example 1 had shown good agreement with polymeric materials having the empirical formula $(C_nH_{2n})_3 \cdot P_4S_3O_4$. This was confirmed by measuring the amount of oxygen absorbed in a typical preparation. A cylindrical glass reaction tube was charged with a mixture of 250 grams (1.48 mols) of dodecene-1 and 66 grams (0.3 mol) of $P_4S_3$. The mixture was heated on an oil bath at 130° C. and dry air at a rate of 200 cc. per minute was passed through it. The exit gases were passed through a gas absorption scrubber containing 300 cc. of normal sodium hydroxide solution, a drying tube, and then through an oxygen analyzer. It was found that 0.69 mol of oxygen was absorbed in the reaction, indicating that about 2 mols of oxygen were reacted for each mol of $P_4S_3$.

Additional confirmation was obtained by first oxidizing the phosphorous sesquisulfide with air. Phosphorous sesquisulfide was recrystallized from orthodichlorobenzene and 22 grams (0.1 mol) of the recrystallized material was dissolved in 225 cc. of hot orthodichlorbenzene and oxidized with air. The solution was heated at 130° C. on an oil bath in a reactor attached to an oxygen analyzer and dry air was bubbled through at a rate of 200 cc. per minute for 93 hours. Oxygen absorption was rapid during the first 6½ hours, after which it slowed appreciably. The results obtained indicated that 1 mol of $P_4S_3$ absorbed 1.85 mols or 3.70 gram atoms of oxygen, which indicates that the oxidation product was a material of the formula $P_4S_3O_4$.

The reaction vessel containing the oxidized $P_4S_3$ suspended in orthodichlorbenzene was heated and 100 grams (0.6 mol) of dodecene-1 were added. The mixture was held at 130°-140° C. for 66½ hours after which the material was transferred to a distillation flask and the solvent and excess olefin were removed by distillation under reduced pressure. The product, weighing 67 grams, was a clear, light yellow viscous oil; it was diluted with toluene, filtered and stripped under reduced pressure to remove suspended impurities. The product was strongly acidic material that indicated upon titration an equivalent weight of about 386. Its titration curve was similar to that of the products prepared from olefins, $P_4S_3$ and air, showing that the same material had been produced.

Data obtained from electron diffraction experiments on $P_4S_3$ vapor indicate that it has the structure shown in Formula I below. The above experimental results are consistent with this structure since each phosphorous atom can combine with an atom of oxygen to form the compound of Formula II:

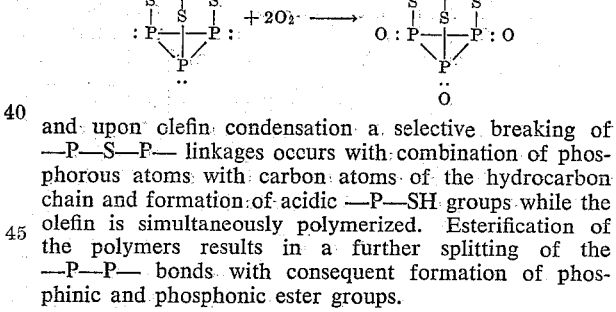

and upon olefin condensation a selective breaking of —P—S—P— linkages occurs with combination of phosphorous atoms with carbon atoms of the hydrocarbon chain and formation of acidic —P—SH groups while the olefin is simultaneously polymerized. Esterification of the polymers results in a further splitting of the —P—P— bonds with consequent formation of phosphinic and phosphonic ester groups.

Example 3

A mixture of 30 grams of product No. 1 of Table 1, having an equivalent weight of 315, and 200 grams of n-butanol was heated at reflux temperature for 10 hours. After removing 11 grams of unreacted butanol by stripping under reduced pressure a resinous dark brown oil was obtained weighing 31 grams. This product contained 3 mols of combined butanol per mol of initial condensation product.

The product was titrated electrometrically with tenth-normal NaOH. Its pH curve contained two breaks, one a pH=7.6 (eq. wt. 322) and the other at pH=10 (eq. wt. 224). Upon heating the solutions from the titrations with excess sodium hydroxide for four hours and back-titrating with tenth-normal HCl the titration curve showed breaks at pH=4 (eq. wt. 334) and pH=7.4 (eq. wt. 121). This indicated the presence of ester linkages in the original product.

Example 4

A portion of product No. 5 of Table 1 (equivalent weight 330) weighing 99 grams was heated and stirred with 95 grams of n-decanol at 120° C. for 2 hours. The unreacted decanol, weighing 44 grams, was distilled off under reduced pressure; the residue consisted of 149 grams of a brown viscous oil containing 3 mols of combined decanol for each mol of the initial olefin-$P_4S_3$- oxygen condensation product. The titration curve of this oil had the same shape as that of the product of Example 3.

A sample of this product was dissolved in lubricating oil and tested against strips of copper-lead bearing metal at a concentration of 0.5% by the standard Underwood oxidation test. After 10 hours the bearing loss was 0.012 gram.

*Example 5*

A 30-gram portion of product No. 2 was refluxed with 200 grams of ethanol for 8 hours after which the excess alcohol was removed by distillation. After stripping under reduced pressure the triethyl ester, weighing 35 grams, was obtained as a brown colored oil. Its titration curve was similar to that of the decanol ester.

Another portion of product No. 2 weighing 30 grams was esterified by refluxing for 12 hours with 125 grams of methanol, distilling off the excess alcohol and stripping at reduced pressure. The product consisted of 25 grams of a dark brown oil.

Portions of these two products were tested for insecticidal activity by dissolving them in acetone and diluting with water and applied to black bean aphids feeding on nasturtium plants and the percent of insects killed was determined at various dilutions. A 95% kill was obtained with the triethyl ester at 1–25,000. The corresponding figures for the trimethyl ester were 92% and 83%. The compounds were also effective poisons against German cockroach in concentrations of 0.5–3% absorbed on solid carriers such as talc and finely divided clay.

*Example 6*

A mixture of 82 grams of product No. 4 of Table 1 and 68 grams of n-octadecanol was heated for 6 hours in 400 cc. of refluxing benzene. The resulting solution was added to 79 grams (0.25 mol) of melted $Ba(OH)_2 \cdot 8H_2O$; the water was removed by azeotropic distillation and the solution was filtered and stripped of benzene by heating under reduced pressure. The product was a clear yellow oil when hot and weighed 163 grams. Analysis showed it to contain 16.6% of barium, 5.3% of phosphorous and 3.74% of sulfur.

*Example 7*

A portion of product No. 5 of Table 1 weighing 143 grams was reacted with 79 grams (0.383 mol) of t-octylphenol by heating the mixture at 100°–150° C. for 4½ hours. The product was converted into the calcium salt by heating it with 43 grams of $Ca(OH)_2$ in a mixture of 200 grams of SAE–10 lubricating oil, 300 grams of water and 50 grams of benzene. The mixture was heated at 130° C. under a reduced pressure of 0.5 mm. of mercury to remove water and benzene and an additional 46 grams of lubricating oil was added, whereupon a clear product weighing 496 grams was obtained. Analysis showed the calcium salt to contain 3.70% of metal, 3.70% of phosphorous and 2.30% of sulfur.

*Example 8*

Product No. 6 of Table 1 was reacted with 144 grams (1 mol) of 3,3,5-trimethylhexanol by heating for 4 hours at 130°–140° C. The resulting ester was neutralized with 59 grams (0.8 mol) of calcium hydroxide in 250 grams of SAE–10 oil and 200 cc. of benzene by the procedure described in Example 6 after which 225 grams of oil was added to form a clear concentrate weighing 1050 grams. The calcium salt analyzed 1.9% of metal, 2.0% of phosphorous and 1.2% of sulfur.

*Example 9*

Product No. 7 of Table 1 was heated with 230 grams (0.9 mol) of a commercial mixture of 45% of cetyl alcohol and 55% of oleyl alcohol for 6 hours at 140°–150° C. The resulting product was neutralized with 70 grams of calcium hydroxide in a mixture of 500 grams of SAE–10 oil and 50 cc. of water and stripped at 120° C. under reduced pressure. The product, weighing 1129 grams, was further diluted with 129 grams of oil to make a lubricating oil additive concentrate. The neutralized ester was analyzed and found to contain 2.34% of calcium, 2.71% of phosphorous and 1.65% of sulfur.

*Example 10*

An ester was prepared by heating 265 grams of product No. 8 of Table 1 with 406 grams (1.5 mols) of n-octadecanol at 140°–160° C. for 5 hours. This ester weighed 652 grams.

(a) A portion of the product weighing 150 grams was neutralized with 106 grams (0.336 mol) of $Ba(OH)_2 \cdot 8H_2O$ in 300 cc. of toluene followed by stripping under reduced pressure at 120° C. The resulting barium salt, weighing 148 grams, was dissolved in 148 grams of SAE–10 oil to a 50% concentrate. The salt analyzed 11.0% barium, 3.1% phosphorous and 2.0% sulfur.

(b) A calcium salt was prepared by stirring 300 grams of the ester with 54 grams (0.9 mol) of calcium hydroxide in a mixture of 300 cc. of toluene, 50 cc. of water and 200 grams of SAE–10 oil followed by stripping at 120°–140° C. at 0.6 mm. of mercury pressure. The stripped product weighed 540 grams and contained 3.94% of calcium, 3.60% of phosphorous and 2.51% of sulfur on an oil-free basis. It was further diluted with 140 grams of oil to a clear additive concentrate.

(c) Another 150 gram portion of the product was converted into the zinc salt by stirring with 33.4 grams of zinc hydroxide in 200 cc. of toluene, 30 cc. of water and 200 grams of SAE–10 hydrocarbon oil. The product was stripped at 120°–140° C. at 0.6 mm. of mercury pressure and further diluted with 160 grams of the same SAE–10 oil. Analysis of a sample showed the salt to contain 5.57% of zinc, 3.42% of phosphorous and 2.29% of sulfur.

*Example 11*

Product No. 9 of Table 1 was also esterified with octadecanol by adding 264 grams of the alcohol and heating for 4 hours at 130°–150° C. The ester was neutralized with 379 grams (1.2 mols) of $Ba(OH)_2 \cdot 8H_2O$ suspended in a mixture of 400 cc. of toluene and 200 grams of lubricating oil. The resulting salt analyzed 10.70% of barium, 3.01% of phosphorous and 1.90% of sulfur. The solution was stripped of volatiles at 140°–150° C. under reduced pressure and was then diluted with an additional 435 grams of oil whereupon a clear oil solution was obtained.

*Example 12*

A portion of product No. 10 of Table 1 weighing 64 grams was esterified at 80° C. with 48 grams of n-decanol. The ester was neutralized with 25 grams of calcium hydroxide in a mixture of 80 grams of oil and 25 cc. of water followed by stripping at 100° C. and 1 mm. of mercury pressure and further diluting with 57 grams of oil. The calcium salt contained 2.98% of metal, 3.37% of phosphorous and 1.90% of sulfur.

*Example 13*

Tall oil alcohol is an octadecanol obtained by roducing with sodium the methyl ester of tall oil fatty acids separated from tall oil by vacuum fractionation. A portion of product No. 12 of Table 1 weighing 304 grams was mixed with 255 grams (0.81 mol) of this alcohol and the mixture was esterified by heating at 100°–135° C. for 5 hours. The calcium salt was then prepared by stirring the ester with 35 grams (0.47 mol) of calcium hydroxide in 300 grams of toluene containing 10 grams of water. The salt was analyzed and found to contain 1.38% of calcium, 1.11% of phosphorous and 0.54% of sulfur. After stripping off volatiles at 140° C. under reduced pressure the product was dissolved in hydrocarbon lubricating oil.

Example 14

Another 225 gram portion of tall oil alcohol was reacted with 294 grams of product No. 13 of Table 1 by heating at 120°–140° C. The calcium salt was prepared by stirring the ester with 60 grams (0.81 mol) of calcium hydroxide in a mixture of 800 grams of toluene, 300 grams of SAE–10 hydrocarbon oil and 25 cc. of water. After stripping off volatiles at 150° C. there was obtained 550 grams of a product analyzing 2.7% of calcium, 3.3% of phosphorous and 1.32% of sulfur.

Example 15

Lubricating oils containing 0.75% by weight of the products of Examples 6 to 14 were subjected to tests of 100 hours' duration in Lauson engines under S. A. E. standard operating conditions using 0.65% of zinc dihexyl dithiophosphate as the oxidation inhibitor. After each test the engine was dismantled and the piston was examined. Ring belt ratings and ratings for overall cleanliness were made on a scale in which 5 represents complete cleanliness, 4.5 and up is from very good to excellent and 4 to 4.5 is from fair to good. The ratings for oils containing each of the detergents under test were as follows:

| Product of Example No.— | Ring Belt Rating | Overall Rating |
|---|---|---|
| 6 | 4.7 | 4.8 |
| 7 | 4.5 | 4.4 |
| 8 | 4.3 | 4.3 |
| 9 | 4.9 | 4.8 |
| 10a | 4.5 | 4.6 |
| 10b | 4.5 | 4.5 |
| 10c | 4.4 | 4.3 |
| 11 | 4.8 | 4.8 |
| 12 | 4.4 | 4.4 |
| 13 | 4.5 | 4.3 |
| 14 | 4.6 | 4.5 |

These results show that the esters of alcohols and phenols containing 10 or more carbon atoms with olefin-$P_4S_3O_4$ condensation products possess detergency in lubricating oils ranging from fair to excellent, the exact rating being largely dependent on the molecular weight of the alcohol used. The corresponding esters of alcohols of less than 10 carbon atoms have considerably less detergency, but may be added to lubricating oils in admixture with the higher alcohol esters or with other detergents to increase the content of active phosphorous and sulfur in the additive composition.

What we claim is:

1. Monohydric alcohol triesters of the products obtained by condensing three mols of a monoolefin with one mol of phosphorous sesquisulfide and two mols of oxygen.

2. Metal salts of the esters defined by claim 1.

3. Triesters obtained by condensing three mols of a monoolefin containing at least 8 carbon atoms with one mol of phosphorous sesquisulfide and two mols of oxygen and esterifying the product with three mols of a member of the group consisting of monohydric alcohols and monohydric phenols by heating a mixture of the reactants at a temperature between the refluxing temperature of said mixture and about 160° C.

4. Polyvalent metal salts of the esters defined by claim 3.

5. Triesters obtained by condensing three mols of a monoolefin containing at least 8 carbon atoms with one mol of phosphorous sesquisulfide and two mols of oxygen and esterifying the product with three mols of a monohydric alcohol containing at least 10 carbon atoms by heating a mixture of the reactants at a temperature between the refluxing temperature of said mixture and about 160° C.

6. Polyvalent metal salts of the esters defined by claim 5.

7. Triesters obtained by condensing three mols of a monoolefin containing at least 8 carbon atoms with one mol of phosphorous sesquisulfide and two mols of oxygen and esterifying the product with three mols of an aliphatic monohydric alcohol of 18 carbon atoms by heating a mixture of the reactants at a temperature between the refluxing temperature of said mixture and about 160° C.

8. Polyvalent metal salts selected from the group consisting of calcium, barium and zinc salts of esters obtained by condensing three mols of a monoolefin containing at least 8 carbon atoms with one mol of phosphorous sesquisulfide and two mols of oxygen and esterifying the product with three mols of a monohydric aliphatic alcohol containing at least 10 carbon atoms by heating a mixture of the reactants at a temperature between the refluxing temperature of said mixture and about 160° C.

9. A method of producing a triester of an olefin-phosphorous sesquisulfide-oxygen condensation product which comprises heating at reaction temperatures one combining proportion of the product obtained by condensing three mols of a monoolefin with one mol of phosphorous sesquisulfide and two mols of oxygen together with at least three mols of a member of the group consisting of monohydric alcohols and monohydric phenols.

10. A method of producing a triester of an olefin-phosphorous sesquisulfide-oxygen condensation product which comprises heating at reaction temperatures one combining proportion of the product obtained by condensing three mols of a monoolefin containing at least 8 carbon atoms with one mol of phosphorous sesquisulfide and two mols of oxygen together with at least three mols of a monohydric alcohol containing at least 10 carbon atoms.

11. A method of producing a polyvalent metal salt of an olefin-phosphorous sesquisulfide-oxygen ester which comprises adding an ester of a monoolefin-phosphorous sesquisulfide-oxygen condensation product to a suspension of a polyvalent metal hydroxide in an organic solvent, agitating the mixture to form a salt, and dehydrating the resulting solution.

12. A method of producing a polyvalent metal salt of a monoolefin-phosphorous sesquisulfide-oxygen ester having the empirical formula $$(C_nH_{2n})_3 \cdot P_4S_3O_4 \cdot (OX)_3$$

in which $n$ is a whole number greater than 7 and X is a member of the group consisting of aliphatic and monohydric aromatic hydrocarbon radicals which comprises adding said ester to a suspension of a polyvalent metal hydroxide in an organic solvent, agitating the mixture to form a salt, and dehydrating the resulting solution.

References Cited in the file of this patent

UNITED STATES PATENTS

| 2,483,571 | Brennen et al. | Oct. 4, 1949 |
| 2,619,482 | Beare | Nov. 25, 1952 |
| 2,662,856 | Bishop | Dec. 15, 1953 |
| 2,712,528 | Hill | July 5, 1955 |